Patented May 27, 1930

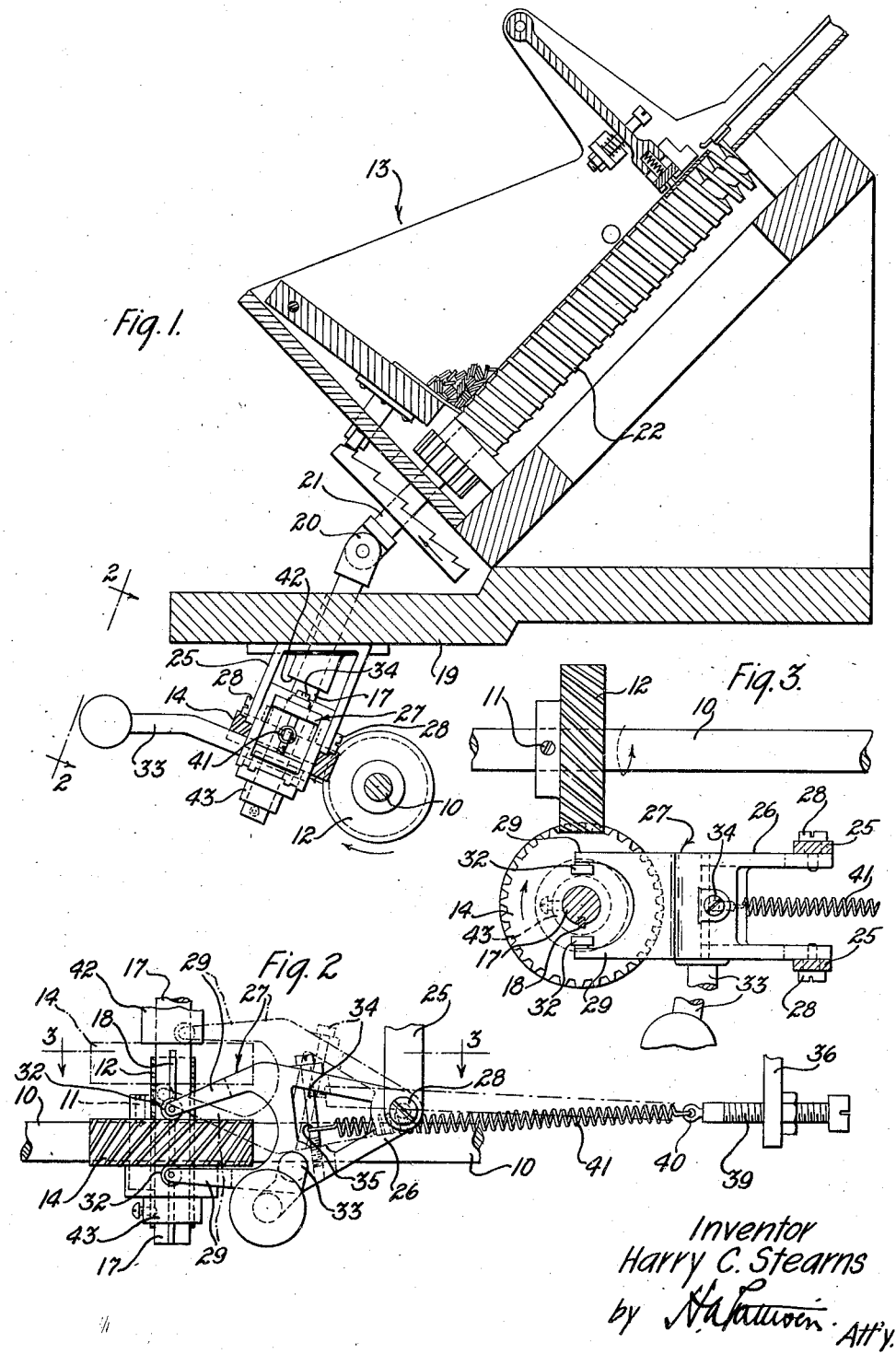

1,759,874

UNITED STATES PATENT OFFICE

HARRY CARPENTER STEARNS, OF OAK PARK, ILLINOIS, ASSIGNOR TO WESTERN ELECTRIC COMPANY, OF NEW YORK, N. Y., A CORPORATION OF NEW YORK

POWER-TRANSMITTING APPARATUS

Application filed July 27, 1927. Serial No. 208,797.

This invention relates to power transmitting apparatus, and more particularly to an overload clutch through which power is transmitted from a driving element to a driven element.

The primary object of this invention is to provide a simple, durable and efficient power transmission means which is responsive to a predetermined load condition for quickly and effectively discontinuing the transmission of power to the driven element.

In accordance with one embodiment of this invention, the driving and driven elements of the clutch comprise helical gears, the driven gear being slidably mounted on its shaft and normally maintained in mesh with the driving gear by a pivotal yoke connected to one end of an off-center or toggle spring, the opposite end of the spring being adjustably mounted for varying the force thereof in accordance with a predetermined load to be transmitted. Fixed to the yoke is a clutch operating lever for manually causing the meshing or demeshing of the gears, the demeshing of the gears being similar to that occurring when the load exceeds a predetermined amount.

Other objects and advantages of this invention will more fully appear from the accompanying description taken in connection with the accompanying drawing which illustrates one embodiment thereof, in which Fig. 1 is a vertical longitudinal section of an article arranging apparatus actuated by a power transmitting apparatus which includes an overload clutch embodying the features of this invention;

Fig. 2 is an enlarged elevation of the clutch as viewed on the line 2—2 thereof looking in the direction indicated by the arrows, and Fig. 3 is a section taken on the line 3—3 of Fig. 2 looking in the direction indicated by the arrows.

One embodiment of this invention will be described as applied to the driving of an apparatus for arranging articles, such as is described and claimed in applicant's copending application, Serial No. 91,280, filed February 27, 1926, to which reference may be had for a more complete illustration and description of the arranging apparatus.

Referring now to the drawing wherein similar reference characters denote similar parts throughout the various views, a rotatable driving shaft 10, which may receive power from any suitable source of driving power, for instance an electric motor (not shown), has secured to rotate therewith by a set screw 11 (Fig. 3) a helical gear 12. Meshing with the gear 12 when the hereinbefore mentioned apparatus for arranging articles is in operation, which apparatus is indicated generally by the numeral 13 (Fig. 1), is a companion helical gear 14 slidably mounted on an angularly disposed shaft 17 as viewed in Fig. 1, by means of a key and keyway 18 (Figs. 2 and 3). The shaft 17 extends upwardly through an aperture provided in a base 19 for supporting the article arranging apparatus 13 and is connected by a universal joint 20 to an extended shaft portion 21 of one of the screw mechanisms 22 of the apparatus 13, one of which is illustrated. Fixed to the under surface of the base 19 is a depending U-shaped bracket 25 between a pair of arms of which is pivoted a bifurcated portion 26 of a yoke member 27 by means of shouldered screws 28. Referring particularly to Figs. 2 and 3 the yoke member 27 is provided at its left end with bifurcated upper and lower members 29 upon each of the furcations of which is mounted a rotatable roller 32, a pair of which engage machined upper and lower surfaces of the gear 14 at diametrically opposite points thereof. To the lower portion of the yoke member 27 intermediate the pivot point and the rollers 32, is a hand operated lever 33 which as viewed in Fig. 1 extends slightly outside of the left side of the base 19 within easy reach of an operator. The lever 33 is used to manually engage or disengage the driving and driven gears 12 and 14, respectively, in a manner which will be made apparent as this description progresses. Threaded into the yoke member 27 midway of the outer surfaces of the members 29 thereof, as viewed in Fig. 3 and at a point between the lever 33 and the axis of the yoke member, is a screw 34. The screw 34 is provided along its shank portion with an annular groove 35 at a point below, as viewed in Fig. 2, or to one side of a line passing at right angles through the axis of the yoke member 27 and midway of the upper and lower surfaces of the gear 14. Depending from the base 19 at a point to the right of the bracket 25 (Fig. 2) is a bracket 36, shown fragmentarily. Threaded into the bracket 36 is a screw 39 provided at its left end with an eye 40. The bracket 36 is positioned so that the longitudinal axis of the screw 36 is on a line passing at right angles through the axis of the yoke member and on a plane which is parallel to the upper and lower surfaces of the gear 14 (Fig. 2). A coiled tension spring 41 of suitable force is connected at opposite ends to the eye 40 of the screw 39 and to the screw 34 at the groove 35.

By selecting a spring 41 of suitable force and adjusting it by means of the screw 39 to overcome the normal end thrust of the driven gear 14 when the driving gear 12 is rotating in the direction of the arrow (Figs. 1 and 3) plus the normal predetermined load to be transmitted to the shaft 17, it will be apparent that the gear 14 will be maintained in mesh with the gear 12 due to the spring being off-center or below the axis of the yoke member 27 as viewed in Fig. 2. If in the operation of the apparatus an abnormal resistance is imposed on the shaft 17 due to the clogging of the screw mechanisms 22 of the apparatus 13, or to any other reason, the force of the spring 41 will be overcome and the gear 14 will move upwardly upon the shaft 17 due to the increased end thrust of the latter gear. Thus, the yoke 28 will be rocked clockwise (Fig. 2) due to the engagement of the rollers 32 with opposite surfaces of the gear 14 and along with it the spring 41 will be swung upwardly about its connection with the eye 40 of the screw 39 until it is in line with the plane of the axis of the yoke 27 whereupon the force of the spring as it snaps over past dead center will rapidly draw the yoke upwardly to the dotted line position thereof (Fig. 2), the upper surface of the gear 14 coming into engagement with an upper thrust collar 42 which also serves as a journal for the shaft 17. In the dotted line position of the parts, the gear 14 is completely disengaged from the gear 12, the latter gear continuing to rotate. The action of the spring 41 when in the dotted line position thereof above the axis of the yoke member 27 is similar to its action when below the axis of the yoke member, the spring maintaining the gear 14 either engaged or disengaged with the gear 12 until a greater force is exerted thereon which is sufficient to move it to the opposite side of the axis of the yoke member 27. To again engage the driven gear 14 with the driving gear 12 the operator pulls downwardly on the lever 33, thus moving the center of the spring 41 below the axis of the yoke member 27, the helically formed teeth of the gears readily meshing in a manner well understood. A lower thrust collar 43 is fixed to the lower end of the shaft 17 to cause a correct positioning of the gear 14 with the gear 12. To manually disengage the clutch gears 14 and 12, the operator merely moves the lever 33 upwardly, the same action taking place as previously described when the load being transmitted exceeds a predetermined amount, as will be clearly understood.

Although the invention has been disclosed and described as applied to a particular type of apparatus, it is clear that it may have a more general application, and that modification can be made without departing from the spirit and scope of the appended claims.

What is claimed is:

1. A power transmitting apparatus comprising a driving and a driven part, said parts being capable of relative movement to each other into operative and inoperative positions, and yielding means associated directly with said parts for maintaining them in either an operative or an inoperative position and responsive to a predetermined load condition for effecting their relative movement into an inoperative position.

2. A power transmitting apparatus comprising a driving and a driven member having cooperating surfaces arranged for permitting the driven member to move in response to the end thrust thereon to permit a disengagement of the surfaces, pivotal means mounted to operatively engage opposite surfaces of the driven member, and an elastic toggle link connected at one end to the pivotal means at one side of the pivotal point thereof for maintaining the surfaces in driving engagement when a normal load is being transmitted but yielding when the load exceeds a predetermined amount to cause a disengagement of the surfaces.

3. A power transmitting apparatus comprising a driving and a driven member having cooperating surfaces arranged for permitting the driven member to move in response to the end thrust thereon to permit a disengagement of the surfaces, pivotal means embracing the driven member and operatively engaging opposite surfaces thereof, a coiled tension spring connected at one end to the pivotal means at one side of the pivotal point thereof for maintaining the surfaces in driving engagement when a normal load is being transmitted but yielding when the load exceeds a predetermined amount to cause a disengagement of the surfaces, and means for varying the force of the spring whereby the operating point of disconnection of the driving and driven parts may be varied.

4. A power transmitting apparatus comprising a driving and a driven gear having cooperating teeth arranged for permitting the driven gear to move in response to the end thrust thereon to permit a disengagement of the teeth, a rotatable shaft for the driven gear, the driven gear being keyed to the shaft for movement in a longitudinal direction thereon, and a toggle mechanism having an elastic link operatively connected to the driven gear and arranged for maintainging the gears in driving engagement when a normal load is being transmitted but yielding when the load exceeds a predetermined amount to cause the driven gear to move upon its shaft and out of mesh with the driving gear.

5. A power transmitting apparatus comprising a driving and a driven member having cooperating surfaces arranged for permitting the driven member to move in response to the end thrust thereon to permit a disengagement of the surfaces, an elastic toggle link operatively connected to the driven member and arranged for maintaining the surfaces in driving engagement when a normal load is being transmitted but yielding when the load exceeds a predetermined amount to cause a disengagement of the surfaces, and means operatively connected to the driven member for manually controlling the engagement and disengagement of the surfaces independent of the elastic toggle link.

6. A power transmitting apparatus comprising a driving and a driven member having cooperating surfaces arranged for permitting the driven member to move in response to the end thrust thereon to permit a disengagement of the surfaces, pivotal means mounted to engage opposite portions of the driven member, an elastic toggle link connected to the pivotal means and arranged for maintaining the surfaces in driving engagement when a normal load is being transmitted but yielding when a load exceeds a predetermined amount to cause a complete disengagement of the surfaces, and a member fixed to the pivotal means for manually controlling the engagement and disengagement of the surfaces independent of the elastic toggle link.

7. A power transmitting apparatus comprising a driving and a driven shaft, helical gears carried thereon, one of the gears arranged for movement upon its shaft in the direction of its end thrust to permit a disengagement of the gears, and means for maintaining the movable gear in mesh with the other gear to counteract the normal end thrust thereon but responsive when the load exceeds a predetermined amount to cause a disengagement of the gears.

8. A power transmitting apparatus comprising a driving and a driven member having cooperating surfaces arranged for permitting the driven member to move in response to the end thrust thereon to permit a disengagement of the surfaces, a pivotal means mounted to operatively engage opposite surfaces of the driven member, an elastic toggle link connected at one end to the pivotal means at one side of the pivotal point thereof for maintaining the surfaces in driving engagement when a normal load is being transmitted but yielding when the load exceeds a predetermined amount to permit a disengagement of the surfaces, and a lever secured to the pivotal means and operable at will to cause the reengagement of the surfaces of the driving and driven members.

In witness whereof, I hereunto subscribe my name this 16th day of July, A. D. 1927.

HARRY CARPENTER STEARNS.